(12) United States Patent
Farwell et al.

(10) Patent No.: US 8,160,809 B2
(45) Date of Patent: Apr. 17, 2012

(54) CLOSE-SPACED LEADER-FOLLOWER NAVIGATION USING CONTROL MIMIC

(75) Inventors: Mark Lalon Farwell, Colorado Springs, CO (US); Chad Martin Seldomridge, Colorado Springs, CO (US); Robert Eric Larson, Monument, CO (US)

(73) Assignee: Exelis Inc., McLean, VA (US)

( * ) Notice: Subject to any disclaimer, the term of this patent is extended or adjusted under 35 U.S.C. 154(b) by 0 days.

(21) Appl. No.: 13/116,095

(22) Filed: May 26, 2011

(65) Prior Publication Data

US 2011/0224844 A1   Sep. 15, 2011

Related U.S. Application Data

(62) Division of application No. 11/634,986, filed on Dec. 7, 2006.

(51) Int. Cl.
*G01C 21/00* (2006.01)
*G05D 1/08* (2006.01)
*G08B 23/00* (2006.01)
*G01S 13/00* (2006.01)

(52) U.S. Cl. ............ 701/205; 701/4; 340/967; 340/961; 342/63; 342/30

(58) Field of Classification Search .................. 244/75.1, 244/76 R, 3.15, 171, 179–186, 196–197, 244/221; 340/995.22, 901–932, 935, 937, 340/938, 948–983, 995.13–996, 426.16–426.19, 340/465, 466, 477, 286.13, 825.71; 701/205, 701/110, 121, 122, 428, 436, 466, 510, 519; 342/63, 30
See application file for complete search history.

(56) References Cited

U.S. PATENT DOCUMENTS

| 4,674,710 A * | 6/1987 | Rodriguez ................ 244/76 R |
| 5,402,119 A | 3/1995 | Feierstein |
| 5,505,531 A | 4/1996 | Griffith et al. |
| 6,271,768 B1 | 8/2001 | Frazier et al. |
| 6,580,978 B1 | 6/2003 | McTamaney |
| 6,640,164 B1 | 10/2003 | Farwell et al. |
| 6,819,780 B2 | 11/2004 | Benson et al. |
| 2002/0011950 A1 | 1/2002 | Frazier et al. |
| 2003/0127272 A1* | 7/2003 | Baker et al. ................ 180/326 |
| 2006/0058939 A1 | 3/2006 | Rayl et al. |
| 2007/0077540 A1 | 4/2007 | Testrake et al. |

* cited by examiner

*Primary Examiner* — James Trammell
*Assistant Examiner* — Muhammad Shafi
(74) *Attorney, Agent, or Firm* — Edell, Shapiro & Finnan, LLC (57) ABSTRACT

A method is provided for automatically controlling a first vehicle (follower vehicle) that is to follow a second vehicle (leader vehicle) in a desired manner with respect to movement of the second vehicle. In the follower vehicle, bearing and acceleration control inputs are generated based on data representing bearing and acceleration control inputs made at the leader vehicle and a position of the follower vehicle relative to the leader vehicle so as to mimic in the follower vehicle the bearing and acceleration control inputs made in the leader vehicle. Adjustments may be made to the control inputs applied in the follower vehicle based on deviation between the velocity of the follower vehicle and velocity of the leader velocity, and on deviation between estimated (actual) follow distance and lateral offset and target follow distance and lateral offset between the follower vehicle and the leader vehicle.

16 Claims, 6 Drawing Sheets

CLOSE-SPACED LEADER-FOLLOWER NAVIGATION USING CONTROL MIMIC

RELATED APPLICATION

This application is a divisional of U.S. application Ser. No. 11/634,986, filed Dec. 7, 2006, the entirety of which is incorporated herein by reference.

BACKGROUND OF THE INVENTION

Vehicle leader-follower systems are used in various military and transportation applications in which one vehicle, called the "leader", moves along the ground, in the air, or space, and one or more other vehicles, each called a "follower", are to follow the leader and/or move along laterally displaced from the leader.

A leader-follower system approach known in the art is one in which the follower follows closely behind or spaced from the leader, such as less than one second from the leader. In current close leader-follower systems, the follower is too slow to respond to changes in speed and bearing of the leader. The follower must first observe or be communicated the change in speed and bearing of the leader before providing inputs to its controls to adjust its own trajectory in order to stay at the proper offset distance from the leader. Thus, there is an inherent delay between the leader changing its speed and/or bearing and the follower changing its speed and/or bearing. This inherent delay causes poor performance in maintaining the same path as the leader and the proper follow distance unless the follow distance is greater than the leader speed multiplied by the sensing and communications delay time.

Figure 1A:
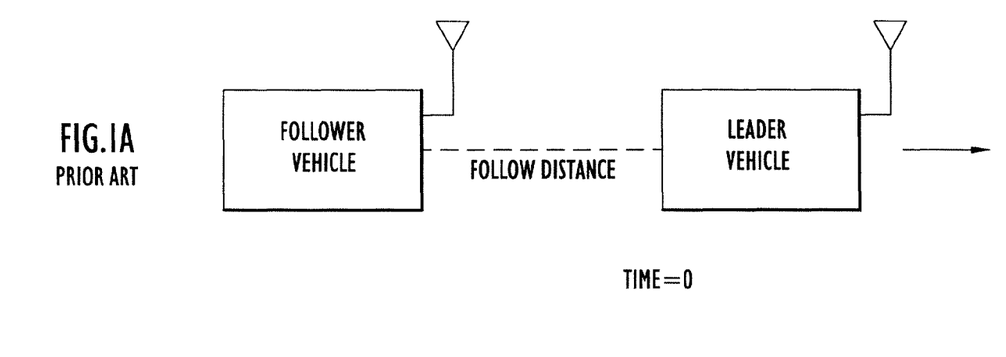
FIGS. 1A and 1B are block diagrams showing a prior art leader-follower control system.
Figure 1B:
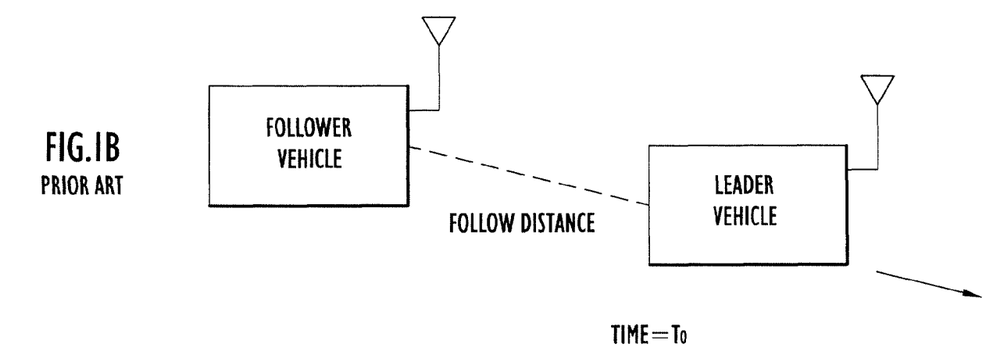

FIGS. 1A and 1B show operation of a conventional close leader-follower system. At Time=0, the follower is directly behind the leader and at the desired follow distance. At this time, the leader is providing input to its control system to decrease speed and turn right. At time Time=$T_0$ (some time interval later), the follower finally is made aware of the change in speed and bearing of the leader, but the follower is already off its path and too close to the leader. Meanwhile, the leader is providing different input to its control systems that is currently unknown to the follower.

In ground vehicles and air vehicles, the time for the vehicle to react to an input change is generally on the order of a one second or more. This reaction time provides for a lower limit on the follow distance using a conventional leader-follower approach. Limiting the follow time interval to two seconds or more is unattractive for many applications because this sets the maximum follow distance to be as much as 80 feet at 30 MPH, for example, and 160 feet at 60 MPH. For certain leader-follower applications, such large follow distances are not acceptable.

Thus, a leader-follower system and method is needed that can allow relatively close following of a leader vehicle without sacrificing vehicle speeds.

SUMMARY OF THE INVENTION

Briefly, a method is provided for automatically controlling a first vehicle (follower vehicle) that is to follow a second vehicle (leader vehicle) in a desired manner with respect to movement of the second vehicle. In the follower vehicle, bearing and acceleration control inputs are generated based on data representing bearing and acceleration control inputs made at the leader vehicle and a position of the follower vehicle relative to the leader vehicle so as to mimic in the follower vehicle the bearing and acceleration control inputs made in the leader vehicle.

According to one embodiment, the follower control method comprises three control loops. In a first control loop that has the lowest latency of the three control loops, the bearing and acceleration control inputs in the leader vehicle are monitored. Control status signals are generated representing the bearing and acceleration control inputs in the leader vehicle, and the control status signals are transmitted to the follower vehicle. The follower vehicle receives the control status signals from the leader vehicle and adjusts bearing and acceleration control inputs in the follower vehicle based on the control status signals received from the leader vehicle at a time so that the bearing and acceleration control inputs are made in the follower vehicle at substantially the same location that the corresponding bearing and acceleration control inputs were made on the leader vehicle.

In a second control loop, a deviation in the velocity of the follower vehicle and the velocity of the leader vehicle is monitored. First bias data is generated for adjusting the bearing and acceleration control inputs in the follower vehicle based on the velocity deviation.

In a third control loop, deviation between estimated follow distance and lateral offset of the follower vehicle with respect to the leader vehicle and target follow distance and target lateral offset is monitored. Second bias data for adjusting the bearing and acceleration control inputs in the follower vehicle is produced based on the deviation in follow distance and lateral offset.

The update rates of the second and third control loops may be progressively slower frequencies than the update rate of the first control loop. Furthermore, data produced in the second and/or third control loops may be used to adjust a conversion made between data representing the control inputs in the leader vehicle to data for control inputs to be made in the follower vehicle.

DETAILED DESCRIPTION

Figure 2:
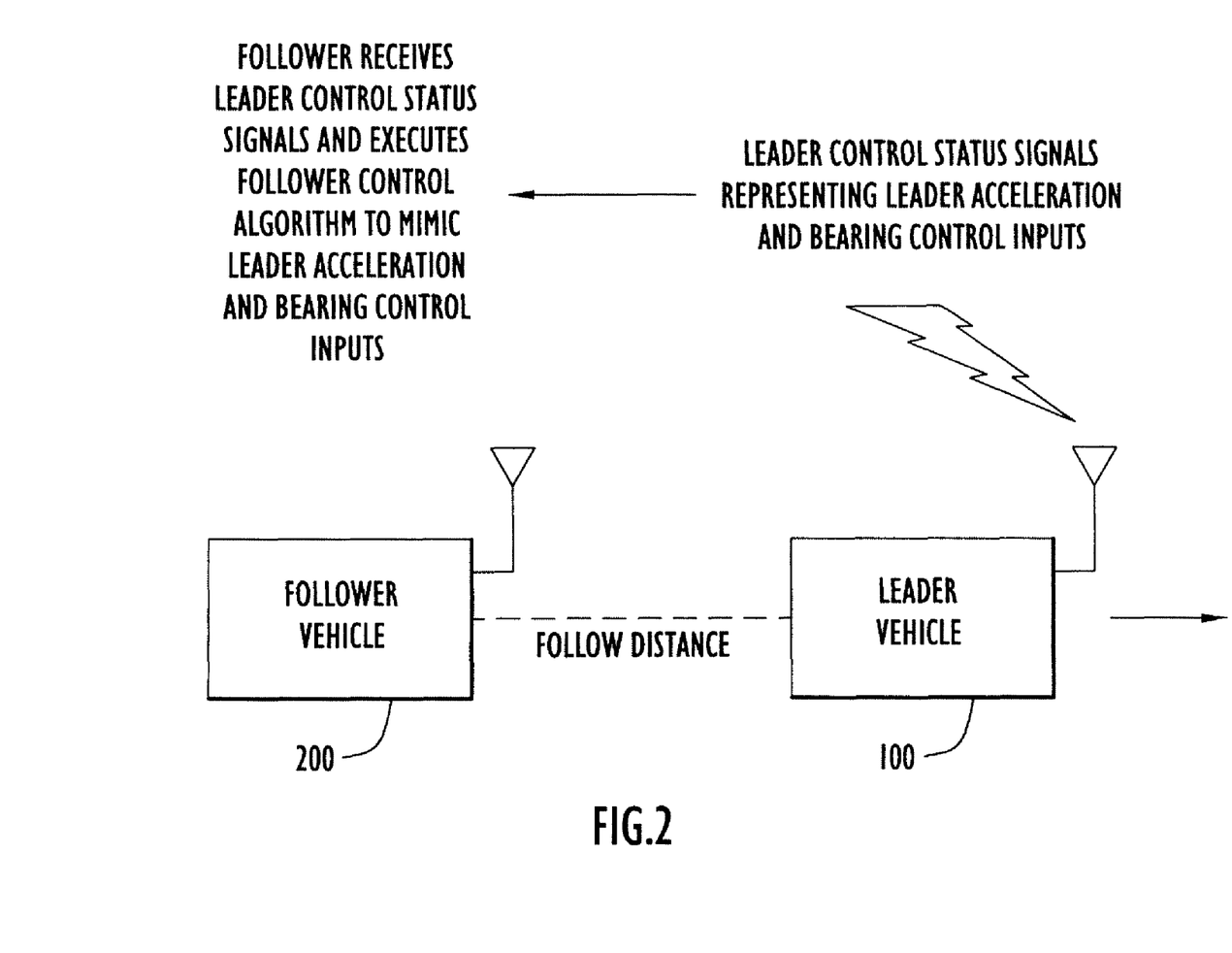
FIG. 2 is a diagram of a leader-follower control system according to an embodiment of the present invention.

FIG. 2 illustrates a general block diagram of a leader-follower system according to an embodiment of the invention. The leader vehicle is shown at reference numeral 100 and the follower vehicle is shown at reference vehicle 200. It should be understood that there may be additional follower vehicles with respect to the leader vehicle 200, or with respect to one or more other follower vehicles. For simplicity, a single leader vehicle 100 and a single follower vehicle 200 are shown.

The leader vehicle 100 generates and transmits to the follower vehicle 200 leader control status signals that represent leader acceleration and bearing control inputs applied in the leader vehicle 100. The follower vehicle 200 receives the leader control status signals and executes a follower control algorithm with control mimic of the leader acceleration and bearing control inputs. In doing so, the follower vehicle 200 is able to maintain a consistent and desirable follow distance with respect to the leader vehicle 100. The follower control algorithm is described hereinafter. The leader vehicle 100 and follower vehicle 200 may be manned or unmanned (remotely or computer controlled, e.g., robotic) air, ground or space vehicles.

Figure 3:
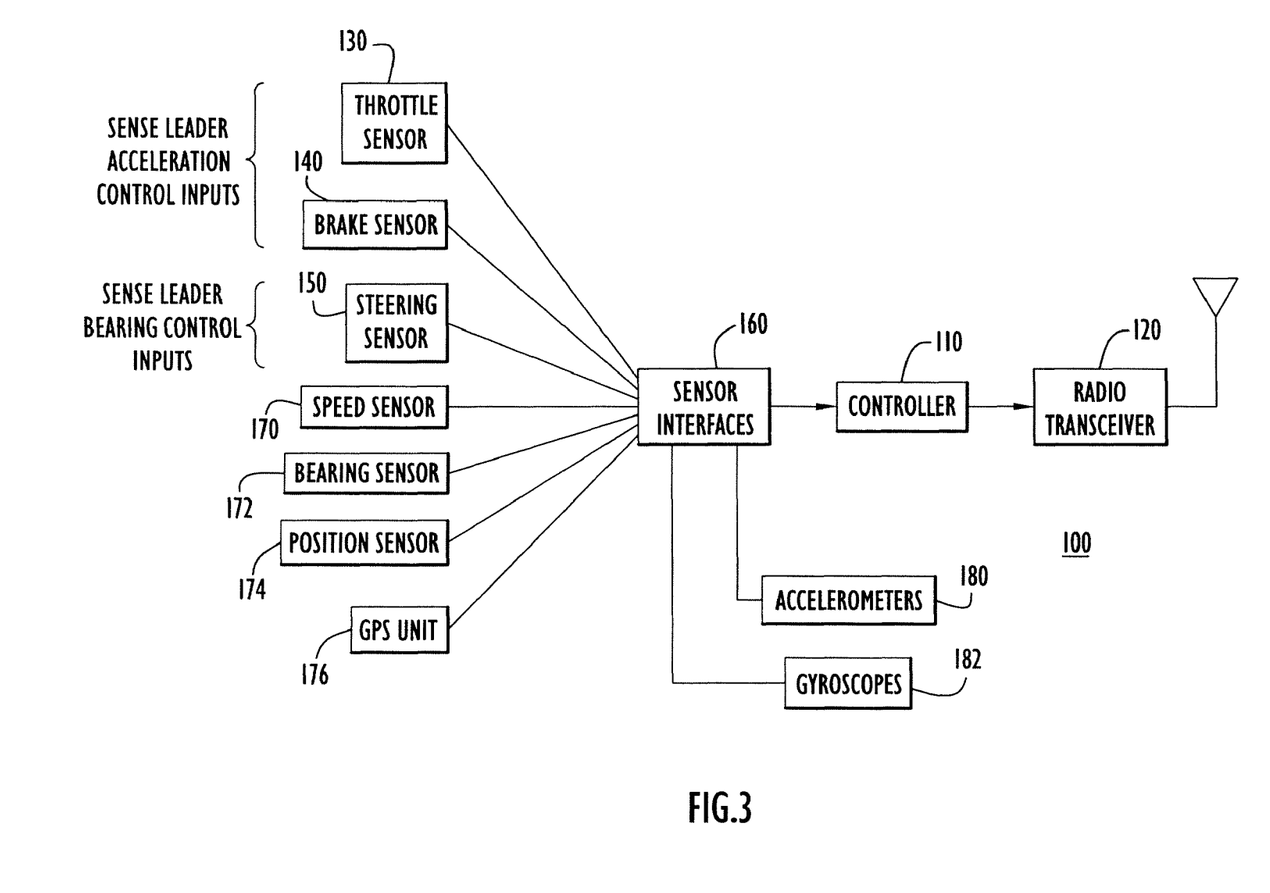
FIG. 3 is a block diagram of components in a leader vehicle according to an embodiment of the present invention.

Turning to FIG. 3, the leader vehicle components are shown generally at reference numeral 100. The leader vehicle components 100 comprise a controller 110, a radio transceiver 120, and a plurality of control input sensors including acceleration control input sensors and bearing control sensors. For example, the acceleration control input sensors may comprise a throttle sensor 130 and a brake sensor 140 and the bearing control input sensor may comprise a steering sensor 150. Outputs of the control input sensors 130, 140 and 150 are connected by way of suitable sensor interfaces represented by reference numeral 160 to the controller 110.

The specific type of sensor used for the function of the throttle sensor 130 depends on the type of motive system and throttle control used in the leader vehicle. For example, if the throttle control consists of a mechanical lever, pedal or other mechanical element, then the mechanical displacement encoder may comprise a mechanical displacement encoder that measures displacement of a mechanical device and converts the measured displacement to a signal representing an amount of acceleration being applied. Alternatively, the throttle sensor 130 may be a flow gauge that measures flow of a fuel mixture to a motor (representative of the amount of throttle input being applied). Further still, the throttle sensor 130 may be a motor voltage or current probe that measures the amount of current or voltage being applied to an electric motor. Regardless of the specific type of throttle sensor used, the throttle sensor 130 generates a throttle sensor signal representing an amount of acceleration being applied in the leader vehicle 100.

Similarly, the specific type of brake sensor 140 used depends on the type of braking system and braking control used in the leader vehicle 100. For example, the brake sensor 140 may comprise a mechanical displacement encoder that measures displacement of a mechanical device (lever, pedal, etc.) and converts the measured displacement to a signal representing an amount of braking being applied. Alternatively, the brake sensor may comprise a flow gauge that measures an amount of hydraulic fluid being applied in a brake line to a brake in the leader vehicle. The braking sensor 140 generates a brake sensor signal representing an amount of braking being applied in the leader vehicle 100.

Again, the specific type of steering sensor 150 depends on the type of steering system used in the leader vehicle 100. The steering sensor 150 may comprise a sensor that monitors rotation of a steering shaft that measures direction and movement of a steering shaft, a wheel deflection encoder that measures deflection of a wheel or a track deflection encoder that measures deflection of a track of a vehicle such as a tank.

The steering sensor 150 generates a steering sensor signal representing changes made to the bearing of the leader vehicle.

There are additional optional sensors in the leader vehicle 100 to sense one or more of speed, bearing and position of the vehicle, independent of the control inputs being applied in the leader vehicle. For example, there may be a speed sensor 170, a bearing sensor 172 and a position sensor 174. Alternatively, a global positioning system (GPS) unit shown at reference numeral 176 is provided in the leader vehicle 100 to indirectly measure the speed, bearing and position of the leader vehicle. The extent of optional sensors provided in the leader vehicle is sufficient to transmit data to the follower vehicle(s) to enable the follower vehicle to compute relative speed, relative bearing and relative position of the follower vehicle with respect to the leader vehicle.

The controller 110 receives the signals from the sensors 130, 140 and 150 (and optionally the 170, 172 and 174 or GPS related parameters from speed, bearing and position derived from the GPS receiver 176) via the sensor interfaces 160. The controller 110 formats the sensor data signals and converts the sensor data signals to leader control status signals that represent leader acceleration and bearing control inputs in the leader vehicle in terms of percent effort for leader throttle, brake and steering control inputs. The controller 110 outputs the leader control status signals to the radio transceiver 120 that transmits the signals to the follower vehicle(s). Percent effort may be in universal units of physics, for example, acceleration and braking in terms of meters per second change per second, and steering in terms of degrees of deviation change per second.

As an alternative to GPS, the leader vehicle 100 may use inertial navigation system (INS) techniques that measure changes in acceleration to determine position of the host vehicle. To this end, the leader vehicle 100 may comprise a block of accelerometers 180 and gyroscopes 182.

Figure 4:
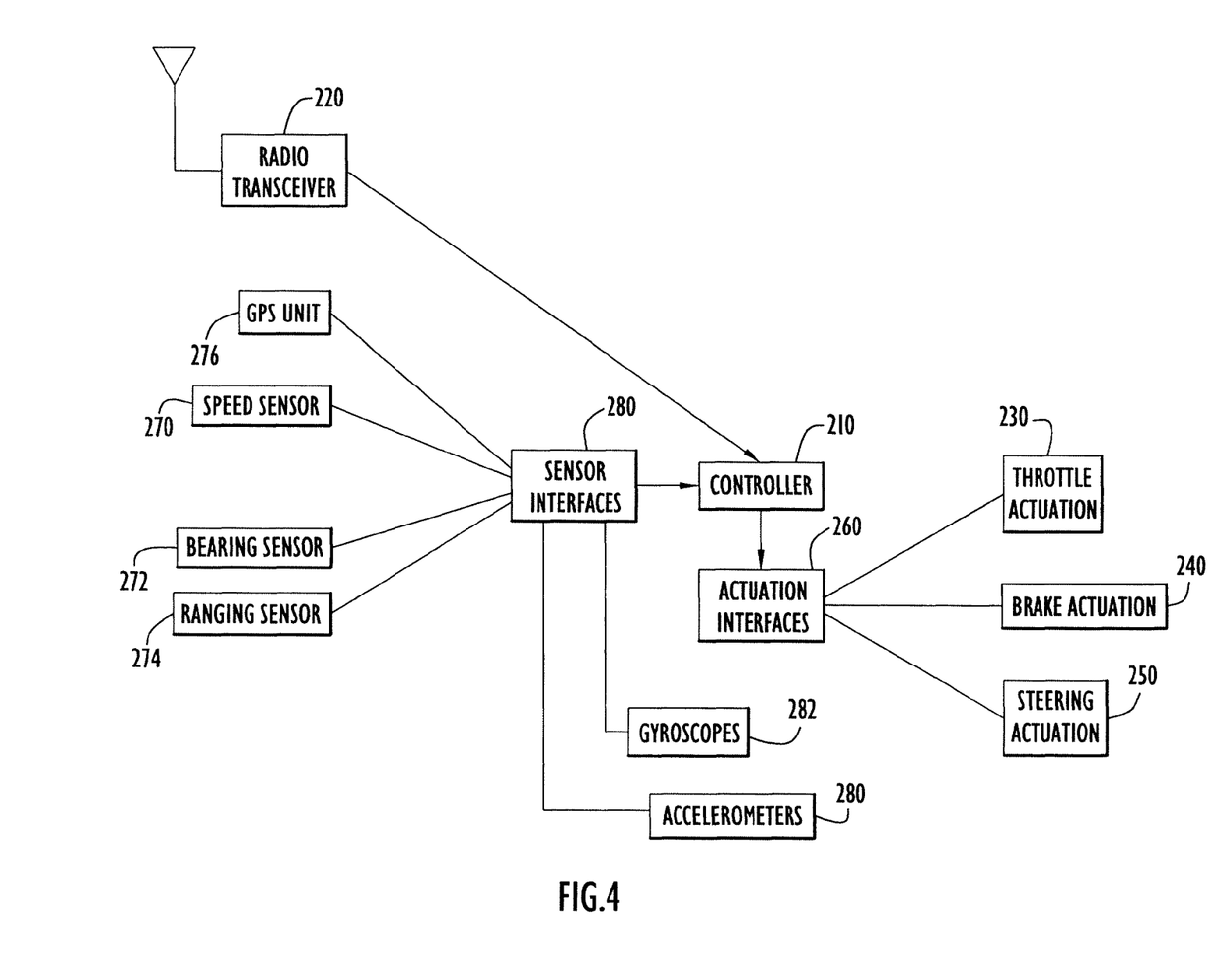
FIG. 4 is a block diagram of components in a follower vehicle according to an embodiment of the present invention.

Turning to FIG. 4, the relevant components in the follower vehicle 200 are described. There is a controller 210 and a radio transceiver 220. The controller 210 performs the various computations described herein to perform the control mimic follower algorithm. The radio transceiver 220 receives the leader controls status signals from the leader vehicle 100. The follower vehicle comprises a throttle actuation element 230, a brake actuation element 240 and a steering actuation element 250. The computer sends control signals to the actuation elements via suitable actuation interfaces shown at reference numeral 260. In addition, the follower may optionally further comprise a speed sensor 270, a bearing sensor 272, a ranging sensor 274 and a GPS unit 276 (that may be used instead of or in addition to the speed sensor 270 and the bearing sensor 272). The extent of optional sensors provided in the follower vehicle is sufficient to enable the follower vehicle to compute relative speed, bearing and position of the follower vehicle with respect to the leader vehicle.

The speed sensor 270 may comprise a speedometer that measures absolute speed of the follower vehicle 200. The bearing sensor 272 may comprise an electronic compass that measures absolute bearing of the following vehicle 200. The ranging sensor 274 is provided to view the leader vehicle 100 from the follower vehicle 200 in order to compute relative velocity, relative position and relative bearing of the follower vehicle 200 with respect to the leader vehicle 100. For example, the ranging sensor 274 may comprise a video camera system, a ranging sensor such as a RADAR sensor or laser imaging detection and ranging (LIDAR) sensor. Further still, the follower vehicle 200 may comprise a block of accelerometers 280 and gyroscopes 282 to enable INS computations.

The follower control algorithm described herein employs direct observation to perform tracking of the follower with respect to the leader. This observation may be performed on the follower, or on the leader and the observation information transmitted to the follower. Only relative position of the follower with respect the leader is needed, although relative position and relative bearing (velocity vector) of the follower with respect to the leader may improve performance. Providing a GPS unit in both the leader and the follower, and transmission of GPS information from the leader to the follower is one way to accomplish computation of relative position and relative velocity. An alternative to using GPS is to use the ranging sensor 274 on the follower vehicle. Still another alternative is to use INS techniques on both the leader and follower, and to transmit INS data from the leader to the follower, similar to that for the GPS data.

FIGS. 3 and 4 show examples of the types of sensors that may be employed on a leader vehicle and a follower vehicle, but all of them together are not required to perform the following control techniques according to the present invention. A basic embodiment of the system uses a subset of those sensors that allows the controller 210 in the follower vehicle to calculate relative speed, position and bearing with respect to the leader vehicle, and provides knowledge of the leader inputs for acceleration and steering/bearing. Thus, only sensors for monitoring acceleration and bearing in the leader vehicle are necessary in order to perform these follower control techniques.

Figure 5:
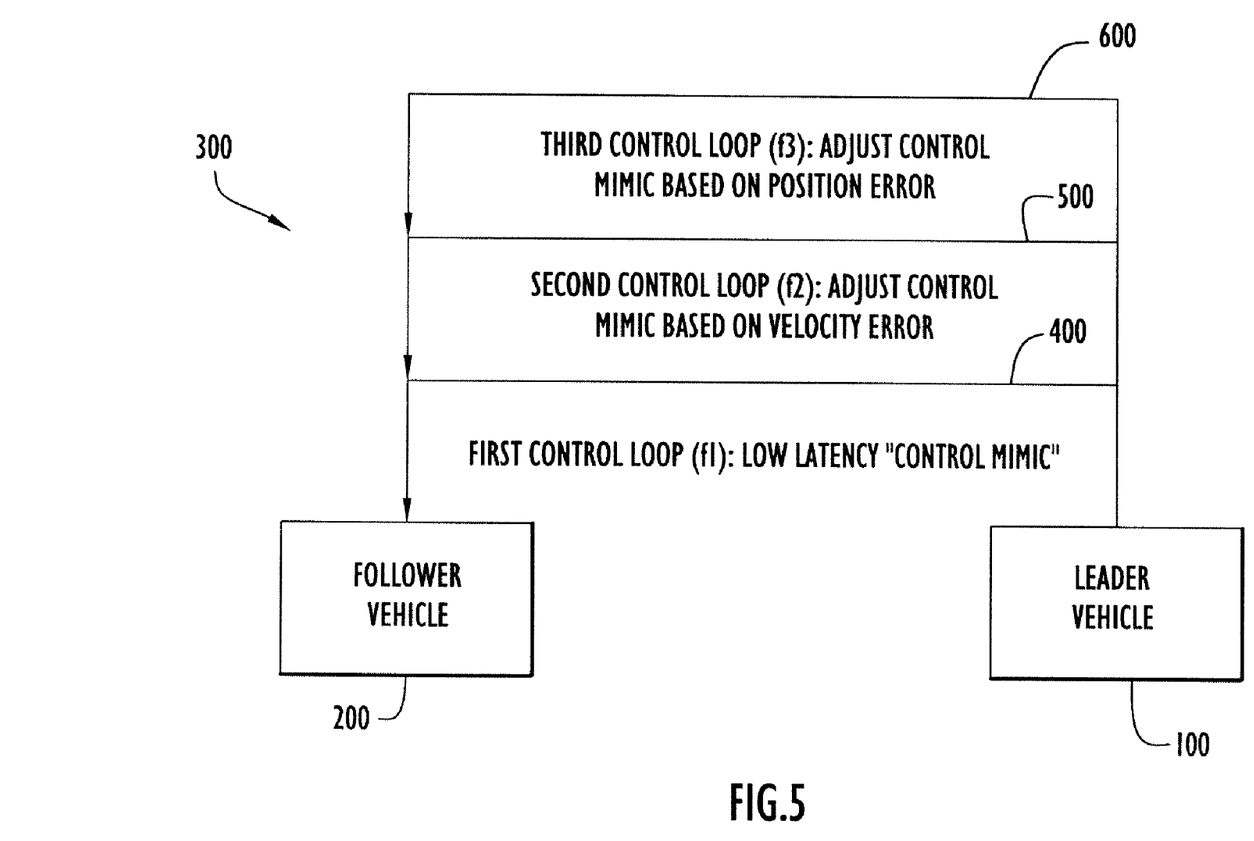
FIG. 5 is a general flow diagram of the leader-follower control method according to the present invention.

Turning now to FIG. 5, the follower control algorithm is shown generally at reference numeral 300 and comprises three control loops 400, 500 and 600. The first control loop 400 is the lowest latency control loop. That is, it is updated at an update rate or frequency f1 that is greater than the other loops so that the follower vehicle can make appropriate corrections to its controls on nearly an immediate basis. The first control loop 400 involves mimicking at the follower vehicle the control inputs made at the leader vehicle at a point in time so that they occur at the substantially the same location as the corresponding control inputs were made at the leader vehicle. The second control loop 500 is performed at an update rate f2 and involves making adjustments to the control mimic inputs in the first control loop 400 based on a deviation in the velocity of the follower vehicle with respect to the velocity of the leader vehicle, referred to herein as the velocity error. An output of the second control loop is referred to herein as first bias data and is used to adjust the throttle, brake and steering control inputs made in the first control loop 400. The third control loop 600 is performed at an update rate f3 and involves making further adjustments to the control mimic inputs made in the first control loop 400 based on deviations in a desired position of the follower vehicle, and in particular a deviation or error from target values for follow distance and lateral offset between the follower and leader. Thus, the third control loop 600 produces second bias data used to further adjust the throttle, brake and steering control inputs made in the first control loop 400. In one embodiment, the update rate f1 of the first control loop is greater than the update rate f2 of the second control loop, which is in turn greater than the update rate f3 of the third control loop.

Figure 6:
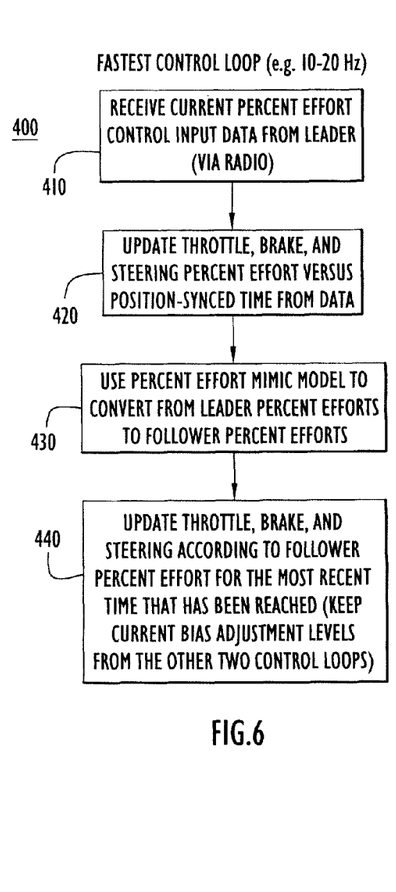
FIG. 6 is a flow chart of a first control loop forming a part of the leader-follower control method of the present invention.
Figure 7:
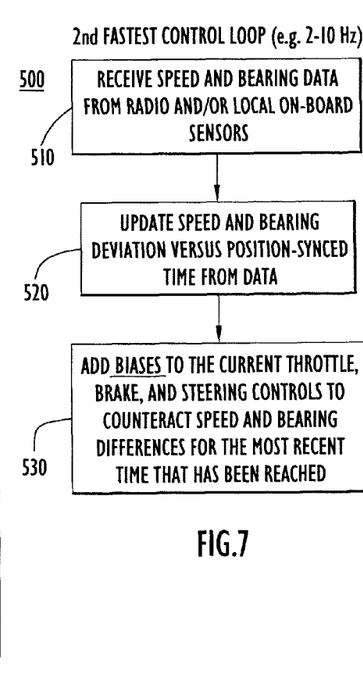
FIG. 7 is a flow chart of a second control loop forming a part of the leader-follower control method of the present invention.
Figure 8:
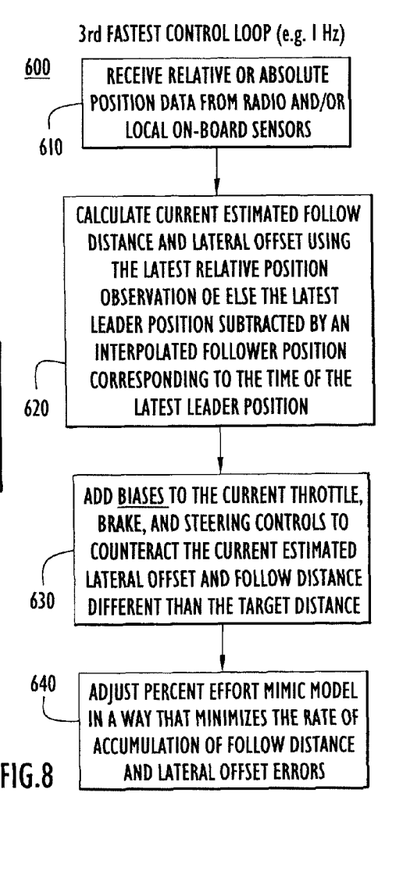
FIG. 8 is a flow chart of a third control loop forming a part of the leader-follower control method of the present invention.

Turning to FIGS. 6, 7 and 8, these three levels of controls are described, where FIG. 6 illustrates a flow chart for the first and fastest control loop (lowest latency) 400, FIG. 7 illustrates the second control loop 500 and FIG. 8 illustrates the third and slowest control loop 600.

With reference to FIG. 6, the fastest control loop 400 is described. This is the low latency control loop that mimics leader control input at the follower. The function of the control loop 400 is to use the status of leader control inputs for steering, brake and throttle to provide the same control input levels to the follower control systems at the proper time so that they occur at the same location as they did in the leader. At 410, the follower vehicle receives the leader control status signals containing current percent effort control input data from the leader vehicle. At 420, the follower updates throttle, brake and steering percent effort versus position-synchronized time from the received leader control status signals. The term "versus positioned-synced time" means that the follower stamps the received leader percent effort data with time information that, based on knowledge of the velocity of the follower, can be used to interpolate and thus determine when the follower vehicle needs to make those control inputs so that they are made at the same position or location where the leader made those control inputs. If the follower is very close to the leader, the follower may be so close the leader vehicle that there is no need to perform this interpolation because the follower will likely need to immediately apply the control inputs to mimic the leader's control inputs due to the small following distance.

At this point, the updated percent effort is still in terms of the leader vehicle's control inputs. At 430, a percent effort mimic model is used to convert from leader percent effort to follower percent effort for the acceleration and bearing control inputs. The percent effort mimic model is a calibration computation that converts leader percent effort to follower percent effort. The percent effort mimic calibration may be determined a priori from knowledge about the controls and control input sensors on the leader vehicle and the controls on the follower vehicle. In addition, the type of motive system used on the leader vehicle and the follower vehicle may be relevant to the percent effort mimic model. The percent effort mimic model may be represented by a point-slot plot that maps percent effort of the leader to percent effort of the follower. Adjustments may be made to the percent effort mimic model based on data generated in the other control loops as described hereinafter.

Next, at 440, the throttle, brake and steering controls in the follower are made according to the follower percent effort data computed at 430 for the current update cycle using the most recent bias data from the control loops 500 and 600. In one embodiment, the control loop 400 is updated at a frequency of 10-20 Hz.

With reference to FIG. 7 control loop 500 is described. The function of the control loop 500 is to adjust for accumulated errors in the control loop 400 according to discrepancies between the velocity vector for the follower vehicle and the velocity vector for leader vehicle. More specifically, at 510, the follower receives observed leader speed and bearing data contained in the leader control status signals from the leader, or determines the relative leader speed and bearing information from on-board ranging sensor 274. At 520, the follower updates speed and bearing (e.g., velocity vector) of the follower vehicle relative to the leader vehicle versus position-synchronized time from the speed and data. That is, the difference or deviation between the velocity vector of the follower vehicle and the velocity vector of the leader vehicle is computed and the velocity deviation or error is time-stamped to account for the location of the follower vehicle when the velocity error is computed. At 530, the follower vehicle generates first bias data based on the velocity error to add adjustments to the current follower throttle, brake and steering controls inputs (at 440 in FIG. 6) in order to counteract the velocity vector error (speed and bearing differences) computed at 520 for the current update cycle for control loop 500. In other words, the velocity vectors of the leader vehicle and follower vehicle, respectively, are subtracted. The difference or discrepancy is used to add a bias adjustment to the follower control inputs determined in control loop 400. In one embodiment, the control loop 500 is updated at a frequency of 2-10 Hz.

Turning now to FIG. 8, the third control loop 600 is described. Control loop 600 is performed at a lower frequency than the second control 500, such as at 1 Hz in one embodiment. The control loop 600 adjusts for accumulated error in control loop 500 according to discrepancies in relative position of the follower vehicle (with respect to the leader vehicle) versus desired relative position, i.e., follow distance and lateral offset. At 610, the follower vehicle receives relative or absolute position data from the leader vehicle and/or from its on-board components, e.g., GPS unit 276 or ranging sensor 274. At 620, the follower computes estimates of the actual follow distance and lateral offset using the latest relative position observation or the latest leader position subtracted by an interpolated follower position corresponding to the time of the latest leader position. Next, at 630, the follower computes second bias data that is added to current throttle, brake and steering control inputs to counteract the deviation of the current estimated lateral offset and follow distance from the target follow distance and lateral offset. This quantity may be referred to as follow distance error and lateral offset error. At 640, the percent effort mimic model (used at 430) is adjusted to minimize the rate of accumulation of follow distance error and lateral offset error. Thus, in control loop 600 the positions of the two vehicles are subtracted and the difference is compared to the desired or target follow distance and desired or target lateral offset of the follower vehicle with respect to the leader vehicle. The discrepancies are used to add a further bias adjustment to the steering, throttle and brake controls produced in control loop 400.

The three control loops 400, 500 and 600 operate concurrently, albeit at different update cycles, ultimately to produce highly accurate updates (at 440) to the controls of the follower vehicle.

It should be understood that the follower control algorithm described herein may be implemented where one or more of the vehicles involved may employ a so-called "drive-by-wire" vehicle control system in which electrical signals are produced in response to control mechanisms (steering wheel, accelerator pedal, throttle lever, brake pedal, etc.) to control the steering/bearing and acceleration of a vehicle. In a leader vehicle that uses "drive-by-wire" control technology, the signals produced for each of the relevant controls would be monitored in the leader vehicle and used to directly determine a measure of percent effort that is transmitted to one or more follower vehicles. If a follower vehicle also uses "drive-by-wire" control technology, then the conversion from leader percent effort to follower percent effort is as described above to produce the electrical follower control input signals.

The system and methods described herein may be embodied in other specific forms without departing from the spirit or essential characteristics thereof. The foregoing embodiments are therefore to be considered in all respects illustrative and not meant to be limiting.

What is claimed is:

1. A system for automatically controlling a follower vehicle that is to move in a desired manner with respect to movement of a leader vehicle, comprising:
   in the leader vehicle:
      one or more sensors are configured to produce signals representing amounts of acceleration and bearing being applied to acceleration and bearing control inputs in the leader vehicle that cause a change in acceleration and bearing of the leader vehicle;
      a controller is configured to receive and to process said signals to produce leader control status signals; and
      a radio device is configured to transmit the leader control status signals;
   in the follower vehicle:
      a radio device is configured to receive the leader control status signals; and
      a controller is configured to utilize a plurality of control loops operated at the same or different frequencies to process the leader control status signals and data representing relative position of the follower vehicle with respect to the leader vehicle and to generate adjustments to bearing and acceleration control inputs in said follower vehicle so as to mimic the bearing and acceleration control inputs made in the leader vehicle, wherein each control loop provides different information associated with the leader vehicle to the controller of the follower vehicle; wherein:
   in a first control loop that is updated at a first frequency:
      the controller of the leader vehicle is configured to monitor bearing and acceleration control inputs representing amounts of bearing and acceleration being applied to bearing and acceleration actuation elements, respectively, in the leader vehicle that cause a change in bearing and acceleration of the leader vehicle; and generate the leader control status signals for transmission by the radio device in the leader vehicle to the follower vehicle, the leader control status signals representing the bearing and acceleration control inputs to the bearing and acceleration actuation elements in the leader vehicle; and
      the controller in the follower vehicle configured to adjust bearing and acceleration control inputs made to bearing and acceleration actuation elements in the follower vehicle based on the control status signals received from the leader vehicle so as to mimic in the follower vehicle the effect of the bearing and acceleration control inputs made in the leader vehicle; and
   in at least a second control loop that is updated at a second frequency that is the same as or different from the first frequency, the controller of the follower vehicle is configured to monitor deviation between velocity of the leader vehicle and velocity of the follower vehicle, generate first bias data for said bearing and acceleration control inputs in the follower vehicle based on said deviation in velocity to counteract the deviation in velocity for a current update cycle of the second control loop, so that the bearing and acceleration control inputs in the follower vehicle are adjusted based further on the first bias data.

2. The system of claim 1, wherein said controller in the follower vehicle adjusts the bearing and acceleration control inputs for the follower vehicle at a point in time such that the acceleration and bearing control adjustments made in the follower vehicle are made at a location where corresponding bearing and acceleration control inputs were made in the leader vehicle.

3. The system of claim 1, wherein the controller in said follower vehicle generates first bias data for bearing and acceleration control inputs in the follower vehicle based on deviation in velocity of the follower vehicle and velocity of the leader vehicle.

4. The system of claim 3, wherein said controller in said follower vehicles further generates second bias data for bearing and acceleration control inputs in the follower vehicle based on deviation between estimated follow distance and lateral offset of the follower vehicle with respect to the leader vehicle and target follow distance and target lateral offset.

5. The system of claim 4, wherein said follower vehicle comprises a global positioning system (GPS) unit that produces position and velocity of the follower vehicle.

6. The system of claim 5, wherein said leader vehicle comprises a global positioning system (GPS) unit that produces position and velocity of the leader vehicle, and wherein said controller supplies position and velocity data of the leader vehicle to the radio device for transmission to the follower vehicle, and wherein the follower vehicle computes relative velocity and relative position of the follower vehicle with respect to the leader vehicle using the position and velocity data received from the leader vehicle.

7. The system of claim 1, wherein the follower vehicle comprises one or more sensors configured to monitor a position of the leader vehicle relative to the follower vehicle and to generate position data representative thereof, and wherein the controller of the follower vehicle generates the adjustments based further on said position data.

8. The system of claim 7, wherein the one or more sensors on the follower vehicle that are configured to monitor a position of the follower vehicle relative to the leader vehicle comprise one of: an optical ranging sensor, radar sensor, and video camera.

9. The system of claim 1, wherein the controller in the follower vehicle is configured to adjust the computations for the bearing and acceleration control inputs in the follower vehicle so as to minimize a rate of accumulation of deviations in follow distance and lateral offset between the follower vehicle and leader vehicle.

10. The system of claim 1, and further comprising a drive-by-wire vehicle control subsystem in the leader vehicle, and wherein the controller in the leader vehicle is configured to monitor acceleration and control inputs used in the drive-by-wire vehicle control system in said leader vehicle.

11. The system of claim 1, wherein the controller in the leader vehicle is configured to monitor a sensor associated with a mechanical device used to adjust bearing of the leader vehicle and to monitor a sensor associated a mechanical device used to adjust acceleration of the leader vehicle.

12. The system of claim 1, wherein the controller in the leader vehicle is configured to generate the leader control status signals that represent acceleration and bearing input percent effort data for the leader vehicle, and wherein the controller in the follower vehicle is configured to convert the acceleration and bearing input percent effort data for the leader vehicle to acceleration and bearing input percent effort data for the follower vehicle using a calibration computation based on a percent effort mimic model.

13. The system of claim 1, wherein the one or more sensors in the leader vehicle comprise at least one of: a sensor that is configured to monitor movement of a steering shaft; a sensor configured to monitor deflection of a wheel; and a sensor configured to monitor deflection of a track of the leader vehicle.

14. The system of claim 13, wherein the one or more sensors in the leader vehicle that monitor control inputs made at the leader vehicle to change acceleration of the leader vehicle comprise at least one of: a sensor configured to monitor displacement of a mechanical device in the leader vehicle used to change acceleration of the leader vehicle; a sensor configured to monitor flow of a fuel mixture to a motor and representative of an amount of throttle input being applied in the leader vehicle; and a sensor configured to monitor a voltage or current applied to an electric motor in the leader vehicle.

15. The system of claim 1, wherein the one or more sensors in the leader vehicle that monitor control inputs made at the leader vehicle to change acceleration of the leader vehicle comprise at least one of: a sensor configured to monitor displacement of a mechanical device applying braking at the leader vehicle; and a sensor configured to monitor an amount of hydraulic fluid being applied in a brake line to a brake in the leader vehicle.

16. An apparatus comprising:
bearing and acceleration elements configured to change bearing and acceleration of a follower vehicle;
a radio device in the follower vehicle configured to receive control status signals from a leader vehicle, the control status signals representing acceleration and bearing control inputs applied in the leader vehicle; and
a controller that utilizes a plurality of control loops operated at different frequencies to process the control status signals and data representing relative position of the follower vehicle with respect to the leader vehicle and to generate adjustments to bearing and acceleration control inputs of the bearing and acceleration elements in said follower vehicle so as to mimic the bearing and acceleration control inputs made in the leader vehicle, wherein each control loop provides different information associated with the leader vehicle to the controller of the follower vehicle; wherein: in a first control loop that is updated at a first frequency, the controller is configured to adjust bearing and acceleration control inputs made to the bearing and acceleration actuation elements based on the control status signals received from the leader vehicle so as to mimic in the follower vehicle the effect of the bearing and acceleration control inputs made in the leader vehicle; and
in at least a second control loop that is updated at a second frequency that is the same as or different from the first frequency, the controller is configured to monitor deviation between velocity of the follower vehicle and velocity of the leader vehicle, generate first bias data for said bearing and acceleration control inputs in the follower vehicle based on said deviation in velocity to counteract the deviation in velocity for a current update cycle of the second control loop, so that the bearing and acceleration control inputs in the follower vehicle are adjusted based further on the first bias data.

* * * * *